(12) United States Patent
Wiechers

(10) Patent No.: US 9,916,558 B2
(45) Date of Patent: Mar. 13, 2018

(54) METHOD, DISTRIBUTION VEHICLE AND SYSTEM FOR AUTONOMOUSLY DELIVERING AND/OR COLLECTING AT LEAST ONE SHIPMENT

(71) Applicant: Ralph Wiechers, Mayschoβ (DE)

(72) Inventor: Ralph Wiechers, Mayschoβ (DE)

(73) Assignee: Deutsche Post AG, Bonn (DE)

( * ) Notice: Subject to any disclaimer, the term of this patent is extended or adjusted under 35 U.S.C. 154(b) by 32 days.

(21) Appl. No.: 15/215,071

(22) Filed: Jul. 20, 2016

(65) Prior Publication Data

US 2017/0024688 A1 Jan. 26, 2017

(30) Foreign Application Priority Data

Jul. 22, 2015 (DE) ........................ 10 2015 111 888

(51) Int. Cl.
*G05D 1/00* (2006.01)
*G05D 3/00* (2006.01)
*G06F 7/00* (2006.01)
*G06Q 10/08* (2012.01)
*H04W 4/00* (2018.01)

(52) U.S. Cl.
CPC ......... *G06Q 10/083* (2013.01); *G05D 1/0027* (2013.01); *H04W 4/008* (2013.01)

(58) Field of Classification Search
CPC ..... G01S 19/01; G01S 19/42; G06Q 10/0833; G06Q 10/08; G06Q 10/083; G06Q 10/08355; G06Q 30/0266; B60P 1/5457; B60R 25/10; B60R 25/20; B60R 25/2036; G05D 1/0244; G05D 1/0278; G05D 1/0282; G05D 2201/0212; G05D 2201/0213; G05D 2201/0216; H04W 12/06

See application file for complete search history.

(56) References Cited

U.S. PATENT DOCUMENTS

2005/0131645 A1* 6/2005 Panopoulos .......... B60P 1/5457
701/472
2007/0233507 A1 10/2007 Publicover
(Continued)

FOREIGN PATENT DOCUMENTS

DE 10 2012 223 152 A1 6/2014
WO WO 2014/090536 A1 6/2014
WO WO 2015/061008 A1 4/2015

*Primary Examiner* — Khoi H Tran
*Assistant Examiner* — Jorge O Peche
(74) *Attorney, Agent, or Firm* — Reinhart Boerner Van Deuren P.C.

(57) ABSTRACT

A method for autonomously delivering and/or collecting at least one shipment using at least one distribution vehicle is described, in which a distribution vehicle approaches a customer vehicle at least partially autonomously and at least partially via the public road traffic, in which the distribution vehicle at least partially autonomously causes opening of a closure unit of the customer vehicle, in which, when the closure unit is open, the distribution vehicle at least partially autonomously places a shipment into the customer vehicle and/or at least partially autonomously removes a shipment from the customer vehicle, which, after placing and/or removing the shipment, the distribution vehicle at least partially autonomously causes closing of the closure unit of the customer vehicle.

16 Claims, 10 Drawing Sheets

(56) References Cited

U.S. PATENT DOCUMENTS

| | | | |
|---|---|---|---|
| 2014/0180914 A1* | 6/2014 | Abhyanker | G01C 1/00 |
| | | | 705/39 |
| 2014/0180959 A1* | 6/2014 | Gillen | G06Q 10/0838 |
| | | | 705/341 |
| 2015/0006005 A1* | 1/2015 | Yu | G06Q 10/08 |
| | | | 701/22 |
| 2015/0154557 A1 | 6/2015 | Skaaksrud | |
| 2016/0096508 A1* | 4/2016 | Oz | H04L 67/125 |
| | | | 701/36 |
| 2016/0098871 A1* | 4/2016 | Oz | G07C 9/00111 |
| | | | 340/5.61 |
| 2017/0200197 A1* | 7/2017 | Brubaker | G06Q 30/0266 |

* cited by examiner

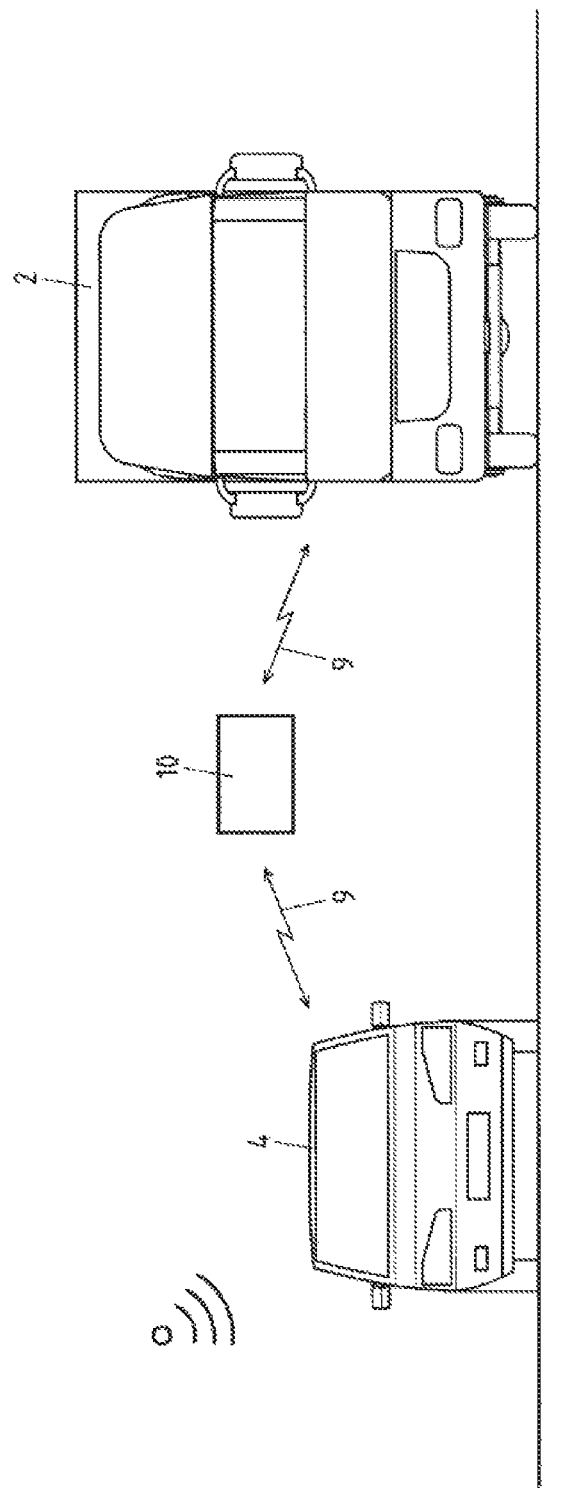

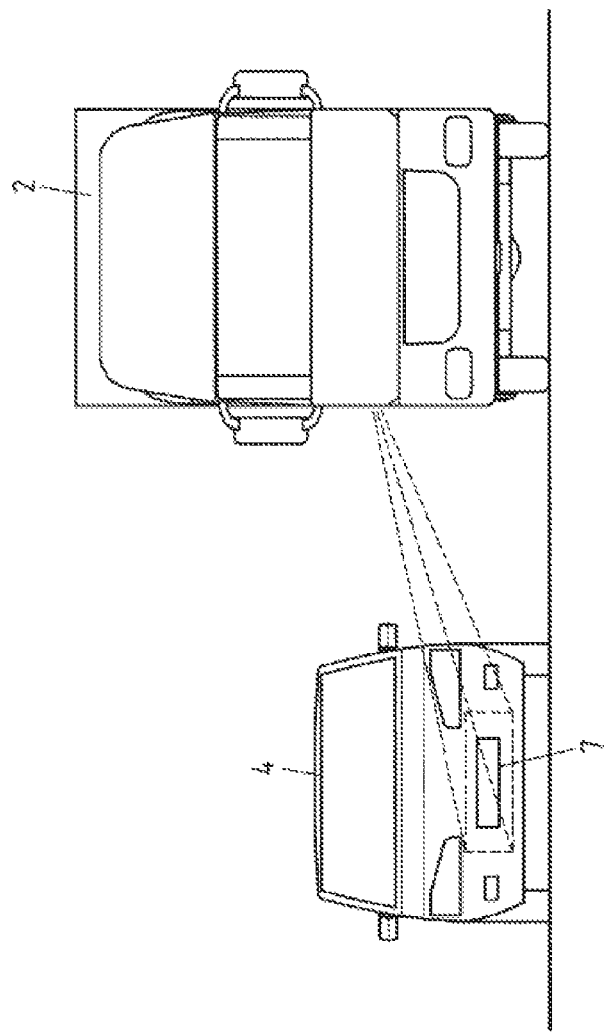

METHOD, DISTRIBUTION VEHICLE AND SYSTEM FOR AUTONOMOUSLY DELIVERING AND/OR COLLECTING AT LEAST ONE SHIPMENT

CROSS-REFERENCE TO RELATED PATENT APPLICATION

This patent application claims priority to German Application No. 10 2015 111 888.2, filed Jul. 22, 2015, the entire teachings and disclosure of which are incorporated herein by reference thereto.

FIELD OF THE INVENTION

The invention relates to a method for autonomously delivering and/or collecting at least one shipment using at least one distribution vehicle, to a distribution vehicle for performing the method and to a distribution system for performing the method.

BACKGROUND OF THE INVENTION

Methods for autonomously delivering and/or collecting at least one shipment using at least one distribution vehicle and corresponding distribution vehicles and distribution systems have already been described, specifically for very different shipments. This makes it possible to save personnel and the associated costs. Since no personnel is needed to drive the distribution vehicles, it is possible to use a greater number of smaller distribution vehicles and a greater number of logistics centers in a particular spatial area, which logistics centers can be approached by the distribution vehicles in order to accept and/or to deliver shipments. This may help to save unnecessary journeys and to deliver shipments more quickly. The delivery times can also be adapted more individually to the addressees of the shipments or to the persons sending shipments. This is intended to increase, for example, the likelihood of finding the corresponding persons at home in order to increase the convenience for the persons and avoid unnecessary transport routes.

However, the disadvantage of the known methods is that they require a considerable amount of control complexity, a multiplicity of distribution vehicles and/or a vast network of logistics centers.

SUMMARY OF SOME EXEMPLARY EMBODIMENTS OF THE INVENTION

The present invention is based on the object of configuring and developing the method, the distribution vehicle and the distribution system of the type mentioned at the outset and previously described in more detail in each case in such a manner that shipments can be delivered and/or collected more easily and in a more convenient manner for the customers.

This object is achieved, according to claim 1, by means of a method for autonomously delivering and/or collecting at least one shipment using at least one distribution vehicle,

- in which a distribution vehicle approaches a customer vehicle at least partially autonomously and at least partially via the public road traffic,
- in which the distribution vehicle at least partially autonomously causes opening of a closure unit of the customer vehicle,
- in which, when the closure unit is open, the distribution vehicle at least partially autonomously places a shipment into the customer vehicle and/or at least partially autonomously removes a shipment from the vehicle,
- in which, after placing and/or removing the shipment, the distribution vehicle at least partially autonomously causes closing of the closure unit of the customer vehicle.

The invention has realized that it is possible to dispense with direct customer contact when collecting and/or delivering shipments. If customer vehicles are used instead to cause collecting and/or delivering of shipments, a considerable simplification and increase in convenience can be achieved. This is because it is then not necessary for the corresponding customer to be at home in order to deliver the shipment. Rather, the shipment can be delivered wherever the customer vehicle is situated. This can be effected, if necessary, substantially independently of the specific whereabouts of the customer. However, the customer may very likely be in the customer vehicle. If the customer is not in the customer vehicle and has parked the customer vehicle, the use of the customer vehicle to deliver and/or collect the shipment allows the further advantage that the customer usually returns shortly to the customer vehicle again anyway. Unnecessary journeys are therefore saved. In addition, the customer gains possession of the shipment more quickly in this manner than if he had to receive the shipment at home or even had to collect the shipment at a branch of a company transporting the shipment. This is a considerable boost in convenience for the customer, in particular in the case of urgent shipments, which applies all the more so if the customer is in the customer vehicle while delivering the shipment.

If the customer vehicle is easier to reach by the distribution vehicle than the customer himself, who may be en route or busy for example, while the customer vehicle is parked at a particular location for a relatively long time, very few distribution vehicles and very few logistics centers are fundamentally needed to deliver and/or collect shipments in a relatively large spatial area. Fewer distribution vehicles which can receive more shipments in order to approach an entire series of customer vehicles in succession are therefore sufficient. This reduces the complexity of the method and therefore also its costs.

The technology needed to deliver a shipment to a customer vehicle and/or to collect a shipment from a customer vehicle is not significantly important against the background of the technology needed anyway and, in particular, against the background of the simplification and increase in convenience associated with the invention.

The shipment may fundamentally be very different objects which may have different shapes, sizes and weights. The shipments should preferably be transported with a reasonable amount of effort and, in particular, should be carried by a person over at least a short distance without major problems. The at least one shipment may be, for instance, an object in the form of piece goods or repackaged goods, for instance packaged bulk goods. In particular, the shipments may be everyday necessities, such as consumables or food, and technical objects and equipment. In this context in particular, they may be personal shipments intended for particular persons or addressed to particular persons. Personal shipments are therefore preferably not intended to pass into the hands of persons not authorized to receive the personal shipments.

Quite fundamentally, the at least one shipment may preferably be correspondence, a parcel shipment and/or a flyer. In this case, a flyer may also be a brochure, a magazine and/or a leaflet, if necessary, while a parcel shipment may also be a small parcel or a package. Moreover, correspondence may also be a letter or a postcard. However, the at least one shipment is particularly preferably a shipment which cannot be readily inserted into a conventional mailbox since the advantages of the method and of the delivery device then take particular effect. Small personal shipments, for instance correspondence, do not require immediate delivery, but rather can be simply stored in the mailbox belonging to the addressee who can remove the correspondence from the mailbox at a later time. However, it may nevertheless be expedient if the shipment in the sense of the invention is correspondence, for instance if the addressee or an authorized person gains possession of the shipment at an earlier time as a result. Alternatively or additionally, however, unnecessary transport routes may also be saved if the correspondence is not introduced into the mailbox belonging to the addressee, but rather is placed into the customer vehicle. However, the above-mentioned advantages fundamentally apply, in particular, in the case of relatively large shipments, for example parcel shipments, since the transport and handling of relatively large shipments are fundamentally more complicated.

The customer vehicle is preferably a passenger car or a small truck. However, it may also be a quad bike or a two-wheeled vehicle, for instance a bicycle, a motorcycle or a scooter. A trailer, a boat or an aircraft is also possible, in principle.

In terms of the method, a shipment can be both delivered and collected. Delivery fundamentally serves the purpose of the customer gaining possession of the shipment. In this case, the customer may be, if necessary, the addressee of the shipment, the driver of the customer vehicle or another person who, after the shipment has been placed into the customer vehicle, gains possession of the shipment even if further delivery of the shipment should be necessary for this purpose. In contrast, collecting the shipment serves the purpose of conveying the shipment to the addressee or a person who is associated with the addressee, in particular is authorized to receive the shipment, and/or to a further customer vehicle.

In order to deliver and/or collect a shipment, the distribution vehicle moves at least partially via the public road traffic in order to approach a customer vehicle. The method described in the present case is therefore not used to transport shipments in a region shielded from the public road traffic, but rather to transport shipments over a relatively large distance which is efficiently reached only using the public road traffic, namely the public road network used in a parallel manner by other road users. The distribution vehicle also moves at least partially autonomously, in which case it is particularly preferred if the distribution vehicle also moves autonomously at least partially in the public road traffic. Autonomous moving is understood in this case as meaning moving which manages without intervention from a driver even if a driver is present in the distribution vehicle but in any case as long as the driver is only monitoring. In addition to autonomous moving, the distribution vehicle can therefore also be equipped for conventional driving by a driver, if necessary, in order to be able to use the distribution vehicle in a more flexible manner.

It is particularly preferred, because it is much simpler and more cost-effective to implement, if the distribution vehicle is moved at least substantially exclusively autonomously and, in particular, if a driver is dispensed with. Alternatively or additionally, a simplification can be achieved if the distribution vehicle moves to the customer vehicle through the public road traffic at least to a highly predominant extent, for example at least 80%, in particular at least 90%, more particularly at least 95%, to be precise autonomously if necessary.

Having arrived at the customer vehicle, the distribution vehicle at least partially autonomously causes opening of a closure unit of the customer vehicle. Opening is autonomous in this case in so far as it is carried out without an operator intervening. Therefore, it is also particularly preferred if opening is carried out in a completely autonomous manner. However, preparatory actions by the customer may be further preferred. The closure unit preferably closes an opening in the customer vehicle. In this case, the closure unit restricts, in particular, access to the customer vehicle through the opening, for instance by virtue of the closure unit in the closed state being arranged at partially in front of the opening. Depending on the configuration of the closure unit, the opening in the customer vehicle may be more or less completely closed by the closure unit in the closed position. At least substantially complete closing will be preferred in many cases, for instance in order to avoid dirt entering the customer vehicle. The opening at least partially closed by the closure unit provides access to at least one internal space of the customer vehicle in the open position of the closure unit. The internal space may be, for example, a loading compartment, a trunk, a loading box and/or a passenger compartment. The closure unit is particularly preferably a door, for instance a side door or a door of a loading compartment, in particular a rear door, for example in the sense of a tailgate or a trunk lid. However, this does not only apply, in particular, when the customer vehicle is an automobile such as a passenger car or a small truck. This has the advantage that relatively large shipments can also be placed into the customer vehicle, in particular without impairing its other use. However, in the case of two-wheeled vehicles, quads, boats or pickups, in particular, closure units in the form of doors, flaps or lids of loading boxes, for example, are also possible and are provided for receiving purposes at, on or in the vehicle. Closure units may fundamentally also be slides, roller doors or the like. If necessary, the closure unit may be in the form of a camera aperture, for instance may comprise a plurality of lamellae which are displaceable with respect to one another. In this case, it should be noted that opening should be only at least partially caused by the distribution vehicle. In this case, it is not necessary for the distribution vehicle to also actually itself open the at least one closure unit of the customer vehicle. Opening can be carried out in another manner. However, the distribution vehicle causes, for example initiates, opening. If necessary, the causing of opening can also be understood as meaning that the complete process of opening the closure unit or at least parts thereof are included.

When the closure unit is open, the distribution vehicle then places at least one shipment into the customer vehicle. Alternatively or additionally, the distribution vehicle can also remove a shipment from the customer vehicle. The placing and/or removing can preferably be carried out through an opening in the customer vehicle which is at least partially uncovered when the closure unit is open. Depending on the configuration of the closure unit, the placing and/or removing can alternatively or additionally also be carried out through the open closure unit. If necessary, shipments can be placed and removed at the same time or in succession. However, it will generally be easier if the shipments are placed and removed in succession. The distribution vehicle may likewise use the same means or else different means to place and remove shipments. The former can at least reduce the outlay on apparatus. In terms of the method, a shipment is placed and/or removed at least partially autonomously, that is to say without a person intervening. In order to make a person dispensable in connection with placing and removing shipments in order to simplify the method and make it more cost-effective, shipments can be placed and removed at least substantially completely autonomously, if necessary.

So that unauthorized persons do not gain access to the customer vehicle or in any case gain only considerably restricted access to the customer vehicle, the closure unit is closed again after placing the shipment into the customer vehicle and/or after removing the shipment from the customer vehicle. This is also at least caused by the distribution vehicle without closing also actually having to be performed by the distribution vehicle. However, the causing of closing results in the closure unit being closed. Therefore, the causing process can also be understood, for example, as meaning only initiating or triggering the closing of the closure unit of the customer vehicle. If necessary, however, the causing process can also include the complete closing process or at least parts of the latter. For the rest, closing is caused at least partially autonomously, that is to say without a person intervening. In this case, it is again particularly simple and effective if at least substantially completely autonomous causing of the closing of the closure unit is involved since it is then possible to at least substantially completely dispense with a person intervening. This simplifies the method and reduces its costs.

The above-mentioned object is also achieved, according to claim 15, by means of a distribution vehicle for performing the method according to one of claims 1 to 14. In this case, the advantages already described above in connection with the method are fundamentally achieved.

In addition, the object mentioned at the outset is achieved, according to claim 16, by means of a distribution system for performing the method according to one of claims 1 to 14, comprising at least one distribution vehicle according to claim 15 and at least one remote control apparatus and/or at least one guide unit. This is also used to achieve the advantages already previously associated with the method.

In a first particularly preferred configuration of the method, after closing the closure unit of the customer vehicle, the distribution vehicle moves to at least one further customer vehicle at least partially autonomously and at least partially via the public road traffic. The distribution vehicle can therefore approach different customer vehicles in succession in order to deliver and/or receive shipments. This reduces the costs of the method arising for each shipment. The distribution vehicle can therefore follow a route and in the process can deliver shipments to a number of customer vehicles and/or can receive shipments from a number of customer vehicles. In this case, the distribution vehicle can be loaded and unloaded at logistics centers, in which case persons are then involved, if necessary. Therefore, the distribution vehicle need not be autonomously processed at a logistics center. However, this may nevertheless be the case. Having arrived at the at least one further customer vehicle, the distribution vehicle can place at least one shipment into the further customer vehicle and/or can remove at least one shipment from the further customer vehicle. This also takes place at least partially autonomously, in which case at least substantially complete autonomy is fundamentally particularly preferred. In the case of the at least one further customer vehicle as well, the distribution vehicle can at least partially autonomously cause opening and/or closing of a closure unit, which will also be preferred in order to avoid granting unauthorized persons access to the interior of the customer vehicle.

Alternatively or additionally, it may be expedient if, before opening of the closure unit of the customer vehicle, the distribution vehicle at least partially autonomously causes unlocking of the closure unit and/or, after closing of the closure unit of the customer vehicle, causes locking of the closure unit. In particular, this is intended to avoid the situation in which the closure unit can be opened by unauthorized persons before and/or after placing the shipment into the customer vehicle and/or removing the shipment from the customer vehicle. The closure unit is locked before the distribution vehicle arrives at the customer vehicle and/or after the distribution vehicle has left the customer vehicle, as is fundamentally expedient in the case of a parked customer vehicle.

In order to safely place and/or receive shipments which may have different shapes and sizes, the distribution vehicle has a suitable transport unit which transports the shipment from the distribution vehicle, in particular from a loading compartment of the distribution vehicle, to the customer vehicle and/or transports the shipment from the customer vehicle to the distribution vehicle, in particular to a loading compartment of the distribution vehicle. Different transport units are possible for this purpose. However, a gripping arm, in particular having a plurality of joints, may be particularly preferred in order to be able to reliably collect different shipments from and/or deliver different shipments to different customer vehicles. The gripping section of the gripping arm may be designed in such a manner that the gripping section can hold shipments of different sizes in different orientations and with little surface pressure in the contact region between the gripping section and the shipment.

Another preferred configuration of the method provides for the at least one customer vehicle to be parked in a parking lot, preferably a public parking lot, a private parking lot and/or a company parking lot. In the case of a boat, the parking lot in the sense of the invention corresponds rather to a mooring in the general sense. In the case of a vehicle, in particular an aircraft, the term may likewise be understood very broadly, for instance also in the sense of a hangar. For the sake of easier comprehensibility, the term parking lot continues to be used in the present case, however, without specifically making a distinction with regard to the respective vehicle in each case. This is also expedient because parking lots in the conventional sense should fundamentally be preferred. The customer vehicle is parked in a parking lot, in particular a public parking lot, a private parking lot and/or a company parking lot, usually over a relatively long period anyway, with the result that there is sufficient time for the distribution vehicle to move to the customer vehicle in the meantime and to place the at least one shipment into the customer vehicle and/or to remove the at least one shipment from the customer vehicle. In addition, parking lots such as, in particular, public parking lots, private parking lots and/or company parking lots are typically accessible to the distribution vehicle without any problems. On the one hand, corresponding parking spaces can be easily reached via the public road traffic. On the other hand, access authorization for the parking lot can also be obtained for the distribution vehicle. If necessary, it is required or desirable in this case for the distribution vehicle to have access authorization and an access effecting means for effecting access to the parking lot. The access authorization may be linked to the access authorization means, for instance in the form of a key. However, it may also be the case, to be precise may preferably be the case, that the access authorization is stored on a carrier. This may be a card which has a magnetic strip or a chip for storing the access authorization. However, a radio-frequency identification (RFID) tag and/or a near field communication (NFC) tag may also be provided with the access authorization. The access authorization can then be read by an access device of the parking lot. After a successful authorization check using the access authorization, the access device can enable access to the parking lot. However, provision may be alternatively or additionally made for the access authorization to be transmitted to the access device of the parking lot using an access authorization means. This can be carried out using a local radio network or a mobile radio network. In this context, Bluetooth, a wireless local area network (WLAN), the global system for mobile communication (GSM), the universal mobile telecommunications system (UMTS) and/or long term evolution (LTE) can be used in a particularly simple and reliable manner. In this case too, the access device can enable access to the parking lot after a successful authorization check. Using the access authorization ensures, for example, that the distribution vehicle gains access to the parking lot, but not any other arbitrary vehicles. This prevents unauthorized persons from parking and is also used for the security of the customer vehicles during parking.

The distribution vehicle can cause unlocking, opening, closing and/or locking of the closure unit of the customer vehicle in a simple and simultaneously reliable manner if the distribution vehicle transmits at least one piece of control information to a control apparatus of the customer vehicle for this purpose, in which case the control apparatus of the customer vehicle then causes unlocking, opening, closing and/or locking of the closure unit as a result of the at least one piece of control information being received and processed. The customer vehicle and the devices installed therein can then practically themselves unlock, open, close and/or lock the closure unit of the customer vehicle. However, this functionality is reliably initiated from outside via the distribution vehicle by means of the control information and is also monitored, if necessary. In this case, the control information can be transmitted by a control means of the distribution vehicle. Modern vehicles have more and more control technology and motorized assistance which allow more and more functions to be performed without manual intervention. The driver must only give the instruction that the corresponding function should be performed. This is carried out, for instance, by pressing a button or by means of a setting on the vehicle. The instruction is then initially processed electrically, with the result that the instruction can fundamentally also come from outside, for instance from the distribution vehicle, provided that a corresponding interface is present. Corresponding interfaces are fundamentally known and available.

Alternatively or additionally, however, the closure unit of the customer vehicle may also be unlocked, opened, closed and/or locked in another manner. This is advantageous, for example, when the customer vehicle does not have a control apparatus which can be used to cause unlocking, opening, closing and/or locking of the closure unit of the customer vehicle by means of a piece of control information. In this case, an operating unit for operating the closure unit can be brought into contact, for example, with the closure unit of the customer vehicle and/or with an opening section of the customer vehicle which is connected to opening of the closure unit. In this case, provision is made for the operating unit to cause unlocking, opening, closing and/or locking of the closure unit as a result of the contact with the closure unit and/or the opening section, for example. This can fundamentally be carried out in different ways. For example, unlocking and locking can be carried out by touching the vehicle. Opening of a tailgate can also be initiated by reaching under the bumper, for instance using the foot. In addition, a tailgate can be triggered, for example, by actuating a button on the tailgate. These initiating actions for causing unlocking, opening, closing and/or locking of the closure unit of the customer vehicle can also be performed by the distribution vehicle, if necessary. The distribution vehicle must be equipped with corresponding means if necessary. Alternatively or additionally, the distribution vehicle can also itself unlock, open, close and/or lock the closure unit of the customer vehicle. Unlocking can then be carried out, for example, by unlocking using a type of key, while opening can be carried out, for example, by pressing a pushbutton, pressing a button and/or swinging open the closure unit, in particular a door. Closing can be carried out, if necessary, by pressing a pushbutton, pressing a button and/or swinging back the closure unit, in particular in the case of a door. Alternatively or additionally, locking can be carried out using a type of key, pressing a pushbutton and/or pressing a button, for example. In other words, handling of the closure unit for unlocking, opening, closing and/or locking by the driver can be emulated by the distribution vehicle.

Direct communication between the distribution vehicle and the control apparatus of the customer vehicle may be complicated under certain circumstances or may constitute a security risk. This can then be circumvented, if necessary, by virtue of the distribution vehicle transmitting at least one piece of remote control information to a remote control apparatus. The remote control information may likewise be transmitted by a control means of the distribution vehicle. The remote control apparatus transmits at least one piece of remote activation information to the control apparatus of the customer vehicle as a result of the at least one piece of remote control information being received and processed, the control apparatus of the customer vehicle then causing unlocking, opening, closing and/or locking of the closure unit as a result of the at least one piece of remote activation information being received and processed. In this case, the remote control apparatus is particularly preferably a remote control apparatus which remotely controls a multiplicity of vehicles or control apparatuses. Remote control apparatuses may be operated, for example, by automobile manufacturers or by units controlling vehicle fleets. They may provide means and technologies which could be used more uneconomically if they had to be separately provided in each individual vehicle.

In order to avoid unauthorized unlocking, opening, closing and/or locking of the closure unit of the customer vehicle, the remote control apparatus can perform an authorization check using the remote control information, for instance. The process of causing the unlocking, opening, closing and/or locking of the closure unit can then be tied to the prerequisite that the authorization check is positive, that is to say authorization has been determined. Alternatively or additionally, however, the authorization check may also be performed by the control apparatus of the customer vehicle, to be precise, in particular, using the control information from the distribution vehicle and/or using the remote activation information from the remote control apparatus. A positive conclusion of the authorization check can then also be used as a prerequisite for causing unlocking, opening, closing and/or locking of the closure unit of the customer vehicle. In this case, the type of authorization information communicated for this purpose and the type of authorization check are fundamentally known from other fields of application and can be transferred in a suitable manner.

A shipment is intended to be delivered and/or collected as smoothly as possible. In addition, the intention is to avoid the customer vehicle being damaged. For this purpose, the control apparatus and/or the remote control apparatus can transmit at least one piece of status information to the distribution vehicle, in which case the at least one piece of status information can enable, initiate and/or block unlocking, opening, closing and/or locking of the closure unit. Alternatively or additionally, the at least one piece of status information can enable, initiate and/or block placing of the at least one shipment into the customer vehicle and/or removing of the at least one shipment from the customer vehicle. Such a piece of status information may be, for example, the information indicating that the closure unit of the customer vehicle has been unlocked. If the distribution vehicle is informed of this, the distribution vehicle can transmit a further piece of control information in order to cause opening of the closure unit, for instance if both pieces of control information cannot be transmitted together and/or cannot be processed together by the control apparatus of the customer vehicle. However, the corresponding status information may also be expedient if unlocking is carried out in a manner other than using a corresponding piece of control information, that is to say mechanically, for example. Alternatively or additionally, a piece of control information may also contain a piece of information relating to the fact that the closure unit has been properly opened. The distribution vehicle can then start to deliver or remove the shipment without coming into conflict with a closure unit which is not open or is only partially open. It would also be expedient if the customer vehicle were to inform the distribution vehicle, via a piece of status information, that the closure unit has been properly closed and/or locked after delivering and/or collecting a shipment. The distribution vehicle can then move on without the closure unit of the customer vehicle remaining open and/or unlocked owing to an error. This is because unauthorized persons could otherwise gain access to the interior of the customer vehicle. The status information can be transmitted from the control apparatus of the customer vehicle to the control means of the distribution vehicle.

A piece of information, in particular at least one piece of control information, at least one piece of remote control information, at least one piece of remote activation information, at least one piece of status information and/or at least one piece of access authorization information, can be transmitted easily and, at the same time, reliably via a local radio network, for instance via Bluetooth or a wireless local area network (WLAN), and/or via a mobile radio network, in particular the global system for mobile communication (GSM), the universal mobile telecommunications system (UMTS) and/or long term evolution (LTE). In this case, a local radio network may not be sufficient for communication, that is to say for transmitting the remote control information and/or the remote activation information for instance, on account of the possible distance between the distribution vehicle and the remote control device. The use of a mobile radio network may therefore be particularly advisable in this case. On the contrary, the at least one piece of status information and/or the at least one piece of control information can preferably be transmitted via a local radio network. This can increase security since the corresponding information therefore cannot be so easily intercepted or manipulated under certain circumstances.

If necessary, shipments can also be collected and/or delivered more reliably by virtue of the distribution vehicle comprising means for detecting the position, the distance and/or the orientation of the customer vehicle and/or of the closure unit of the customer vehicle. Alternatively or additionally, it can therefore be ensured that the distribution vehicle actually finds the customer vehicle and correctly identifies it as such. Otherwise, there would be the risk of the distribution vehicle considering another vehicle to be the customer vehicle. If the correct customer vehicle has been identified or detected as such by the distribution vehicle, the distribution vehicle is also informed of the distance to the customer vehicle and the orientation of the customer vehicle, if necessary. In this case, the distance and the position of the closure unit, which closes an opening in the customer vehicle through which a shipment is intended to be placed into the customer vehicle and/or removed from the customer vehicle, are of particular interest. On the basis of the corresponding information, the distribution vehicle can deliberately change its position with respect to the customer vehicle until a suitable, in particular predetermined, position relative to the customer vehicle is achieved. In this case, this position can be defined, in particular, by the distance and the orientation of the customer vehicle and/or of the closure unit of the customer vehicle relative to the distribution vehicle. In the corresponding manner, the distribution vehicle can reliably approach the customer vehicle and/or the closure unit of the customer vehicle.

In this case, the position, the distance and/or the orientation of the customer vehicle and/or of the closure unit of the customer vehicle, for instance for identifying the customer vehicle and/or approaching the customer vehicle, can be detected using at least one optical locating means capturable by the distribution vehicle, preferably a motor vehicle license plate number, a barcode or a computer-generated hologram. Alternatively or additionally, a corresponding detecting process can also be based on at least one electrical locating means which is readable by the distribution vehicle. This may be a radio-frequency identification (RFID) tag and/or a near field communication (NFC) tag. Alternatively or additionally, at least one locating signal which is emitted by the customer vehicle and is receivable by the distribution vehicle is also possible, if necessary. This locating signal is preferably transmitted via a local radio network, for instance Bluetooth and/or a wireless local area network (WLAN), and/or a mobile radio network, in particular the global system for mobile communication (GSM), the universal mobile telecommunications system (UMTS) and/or long term evolution (LTE).

So that the distribution vehicle actually first of all finds out where the customer vehicle is roughly situated before it can be actually detected as such and approached in situ, it is appropriate to provide a corresponding piece of location information which can then be processed accordingly. In this context, it may therefore be preferred if the customer vehicle and/or the driver first of all determine(s) corresponding location information relating to the position of the customer vehicle. GPS (global positioning system) information or other objective information can be used for this purpose, for example. GPS information is appropriate in so far as modern vehicles usually also comprise a navigation system which captures and processes GPS information. In order to forward the location information, the driver and/or the customer vehicle can use a local radio network and/or a mobile radio network. This is easily and reliably possible, in which case Bluetooth, a wireless local area network (WLAN), the global system for mobile communication (GSM), the universal mobile telecommunications system (UMTS) and/or long term evolution (LTE) can be used, for example. In this case, the location information can be directly transmitted to the distribution vehicle, if necessary. However, since it may be unclear which distribution vehicle is responsible and because the actions of the distribution vehicle also have to be partially guided from the outside, it will be particularly preferred to alternatively or additionally transmit the location information to a guide unit for guiding the distribution vehicle, in particular a number of distribution vehicles. The closest guide unit is possible here, if necessary. In this case, the term guide unit should preferably be broadly understood. The guide unit may stipulate the route of the distribution vehicle at least in certain limits and/or may coordinate the route of the distribution vehicle with other distribution vehicles. Alternatively or additionally, the guide unit may also be incorporated in the logistics of the shipments before they are distributed and/or after they have been collected. For example, the guide unit can decide which distribution vehicle is loaded with which shipments or what needs to happen with the shipments accepted by a distribution vehicle.

The distribution vehicle for performing the method has, in particular, the features described above and the features described below in connection with the distribution vehicle, that is to say a control means, a gripping arm and at least one shipment, for instance. On account of the detailed explanations of these features at another point, there is no need to explain these features again in the present case in order to avoid unnecessary repetitions.

In addition to at least one distribution vehicle, the distribution system also has at least one remote control apparatus and/or at least one guide unit. As already previously described, the guide unit and/or the remote control apparatus is/are in contact with the distribution vehicle here. In this case, the remote control apparatus can receive and process a piece of remote control information in order to transmit a piece of remote activation information to a customer vehicle as a result of said remote control information. The remote control apparatus and the distribution vehicle can preferably use a mobile radio network for this purpose. Alternatively or additionally, however, the remote control apparatus may also be designed to receive status information from a customer vehicle and to forward this status information to the distribution vehicle. The remote control apparatus and the distribution vehicle can also use a mobile radio network for this purpose. The guide unit can receive location information and can forward it to the distribution vehicle, if necessary after processing. Alternatively or additionally, the distribution vehicle can also receive, from the guide unit, information relating to a sequence of locations to be departed or the like. The guide unit can therefore at least partially predetermine a route of the distribution vehicle. If necessary, the guide unit can be provided for the purpose of guiding and/or coordinating the distribution vehicle, in particular a number of distribution vehicles. Alternatively or additionally, the guide unit may also be incorporated in the logistics of the shipments before they are distributed and/or after they have been collected. For example, the guide unit can decide which distribution vehicle is loaded with which shipments or what needs to happen with the shipments accepted by a distribution vehicle. The guide unit and/or the at least one distribution vehicle can likewise use a mobile radio network, if necessary, for communication purposes.

BRIEF SUMMARY OF THE SEVERAL VIEWS OF THE DRAWING

The invention is explained in more detail below using a drawing which illustrates only an exemplary embodiment. In the drawing:

FIGS. 2A-H show a schematic illustration of individual method steps of the method according to FIG. 1.

DETAILED DESCRIPTION OF THE INVENTION

Figure 1:
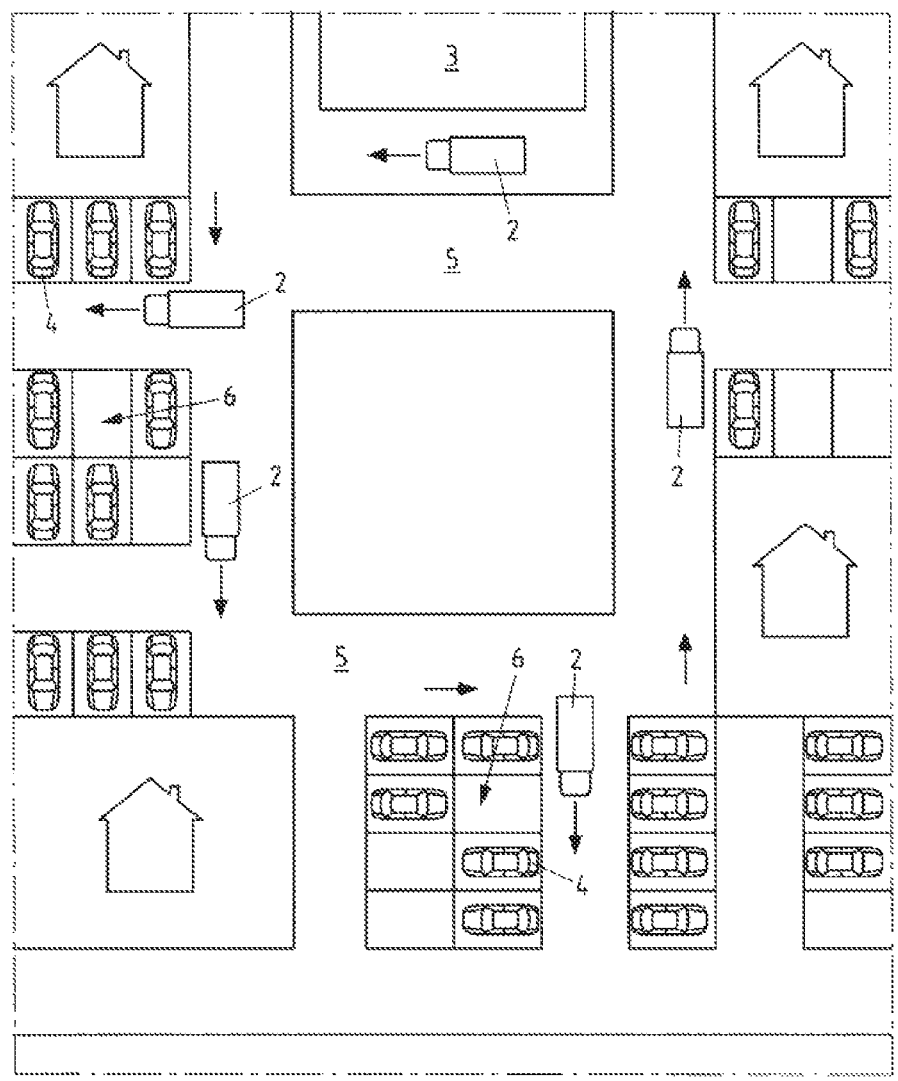
FIG. 1 shows a schematic overview illustration of the method according to the invention.

FIG. 1 illustrates a method for autonomously delivering and/or collecting at least one shipment 1 using at least one distribution vehicle 2. The distribution vehicle 2 is loaded with personal shipments 1 intended for different persons in a logistics center 3. The distribution vehicle 2 receives information relating to the locations at which the shipments 1 are intended to be delivered. In addition, the distribution vehicle 2 receives information relating to the locations at which shipments 1 need to be collected. The locations at which shipments 1 are intended to be delivered or collected may at least partially be customer vehicles 4. The information relating to the individual locations can all be transmitted to the distribution vehicle 2 in the logistics center 3. However, provision may also be made for this information to be gradually transmitted to the distribution vehicle 2 after leaving the logistics center 3. In this case, the distribution vehicle 2 can independently compile its route or else can be advised of a route by the logistics center 3.

The loaded distribution vehicle 2 moves from the logistics center 3 autonomously, that is to say without a driver intervening, via public roads 5 and through the public road traffic to a customer vehicle 4 parked in a parking lot 6. In this case, the distribution vehicle 2 is designed in such a manner that it could alternatively also be conventionally driven by a driver, but this is not necessary. The distribution vehicle 2 is informed of the approximate location of the customer vehicle 4 and the distribution vehicle 2 autonomously approaches it.

In the parking lot 6, the distribution vehicle 2 now deliberately searches for the customer vehicle 4 which is detected and identified by the distribution vehicle 2, for example using the motor vehicle license plate number or another special position-finding means 7. The distribution vehicle 2 then continues to approach the customer vehicle 4, to be precise in such a manner that the distance and the relative orientation between the customer vehicle 4 and the distribution vehicle 2 are within a predetermined scope. This ensures that the shipment 1 can be delivered to the customer vehicle 4 by the distribution vehicle 2 without any problems. The distribution vehicle 2 can then cause opening of a closure unit 8 in the form of a door of the customer vehicle 4, through which the distribution vehicle 2 can place the shipment 1 into the customer vehicle 4. The distribution vehicle 2 then causes closing and locking of the closure unit 8 in the form of the door and leaves the customer vehicle 4, for example in the direction of a house, an apartment or a further customer vehicle 4. The same procedure is carried out there or a shipment is removed from the customer vehicle 4 after opening of the closure unit 8 and before closing of the closure unit 8 again. This shipment 1 can then remain in the distribution vehicle 2 until the distribution vehicle 2 reaches the logistics center 3 again at the end of its route. The shipment 1 can then be unloaded there and distributed further.

A part of the method described above is explained in more detail below using FIGS. 2A to 2H. In a first step illustrated in FIG. 2A, the customer vehicle 4 determines its position with the aid of GPS (global positioning system) information 9. The customer vehicle 4 then transmits this GPS information 9 or information which has already been preprocessed to a guide unit 10 which guides the distribution vehicle 2 to the customer vehicle 4. The guide unit 10 then transmits further information relating to the position of the customer vehicle 4 to the distribution vehicle 2 so that the distribution vehicle 2 can autonomously approach the customer vehicle 4. In the example, the customer vehicle 4 is in a parking lot 6 with restricted access. This may be a public underground parking garage or a company parking lot, for example.

Figure 2B:
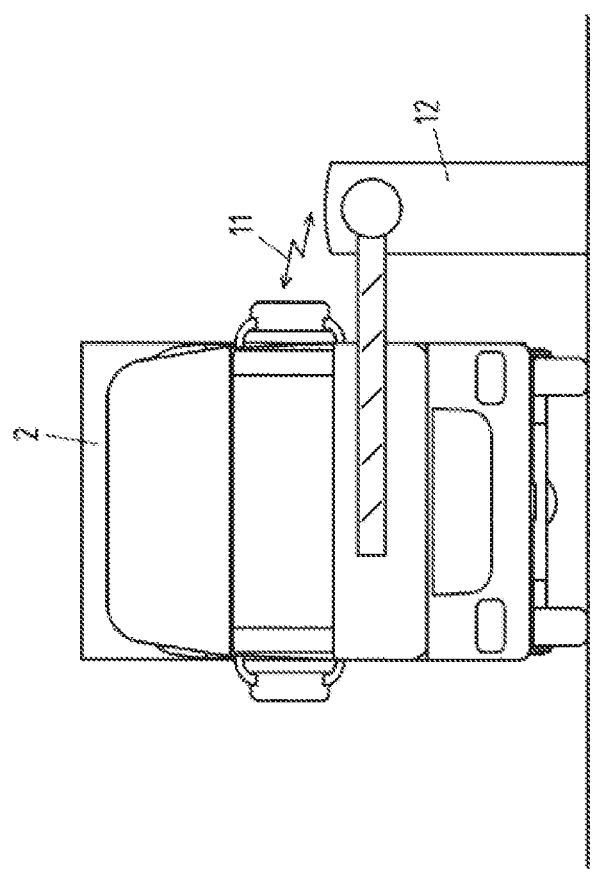

So that the distribution vehicle 2 can reach this parking lot 6, the distribution vehicle 2 must first of all verify its access authorization, as illustrated in FIG. 2B. For this purpose, the distribution vehicle 2 can transmit access authorization or a piece of access authorization information 11 to a barrier or another access control means 12 which enables and/or blocks access. The access authorization is preferably transmitted to the distribution vehicle 2 by the customer, although different alternatives are also conceivable. In the present example, the barrier opens on account of the information relating to the access authorization being received and processed. The distribution vehicle 2 then moves to the parking lot 6, to be precise to where the distribution vehicle 2 assumes the customer vehicle 4 to be.

The approximate position of the customer vehicle 4, which is known to the distribution vehicle 2, need not suffice to identify the customer vehicle 4 in a parking lot 6 having a multiplicity of parked vehicles. This is due, for example, to the fact that the customer vehicle 4 has moved away in the meantime or that the known GPS information 9 is too inaccurate. The distribution vehicle 2 now optically scans the locating means 7 in the form of motor vehicle license plate numbers of the possible parked vehicles until the distribution vehicle 2 identifies the customer vehicle 4 using the known motor vehicle license plate number. This is schematically illustrated in FIG. 2C. If necessary, another locating means 7 may also be captured, if necessary also in a manner other than optically. When it is clear which customer vehicle 4 the shipment 1 is intended to be placed into, the distribution vehicle 2 continues to approach the customer vehicle 4. While this is happening, the distribution vehicle 2 determines the distance to the customer vehicle 4 and/or the relative position of the customer vehicle 4 with respect to the distribution vehicle 2. On the basis of this information, the distribution vehicle 2 moves itself into a position with respect to the customer vehicle 4 from which the shipment 1 can be delivered. In this case, the distribution vehicle 2 knows which requirements are imposed on this corresponding position.

Figure 2D:
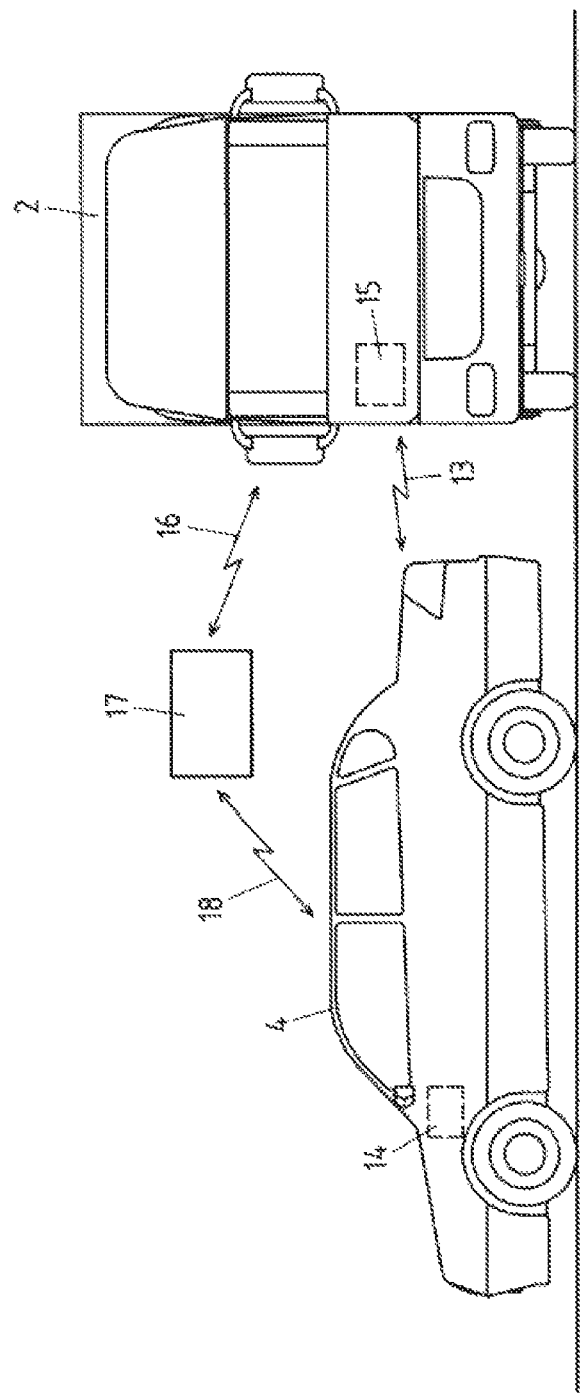

In a next step, which is illustrated in FIG. 2D, the distribution vehicle 2 causes unlocking and opening of a closure unit 8 in the form of a door of the customer vehicle 4, in the sense of a trunk lid or a tailgate. For this purpose, the distribution vehicle 2 can either transmit a piece of control information 13 to a control apparatus 14 of the customer vehicle 4, for which the distribution vehicle 2 has control means 15. However, the control means 15 may also be used to transmit a piece of remote control information 16 to a remote control apparatus 17 which transmits a piece of remote activation information 18 to the control apparatus 14 of the customer vehicle 4 after receiving and processing the remote control information 16. The remote activation information 18 or the control information 13 which is received and processed in the control apparatus 14 of the customer vehicle 4 is used by the distribution vehicle 2 to cause unlocking and opening of the closure unit 8. In this case, the control apparatus 14 of the customer vehicle 4 then controls the corresponding actuators, for example electric motors, if necessary, in order to cause unlocking and opening of the closure unit 8.

Figure 2E:
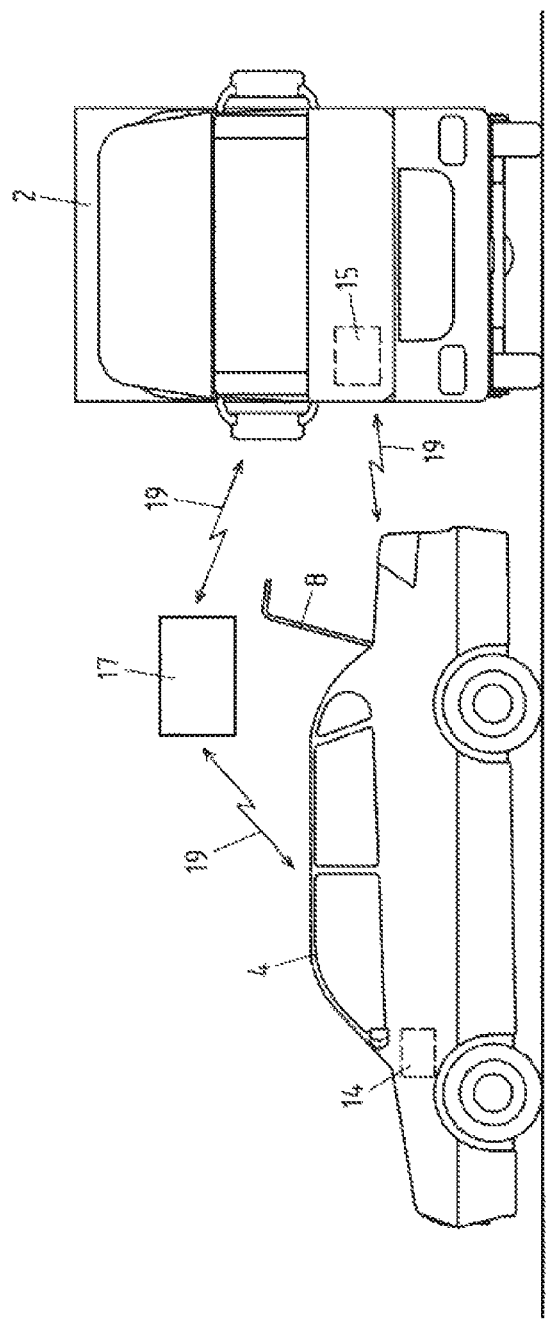
Figure 2F:
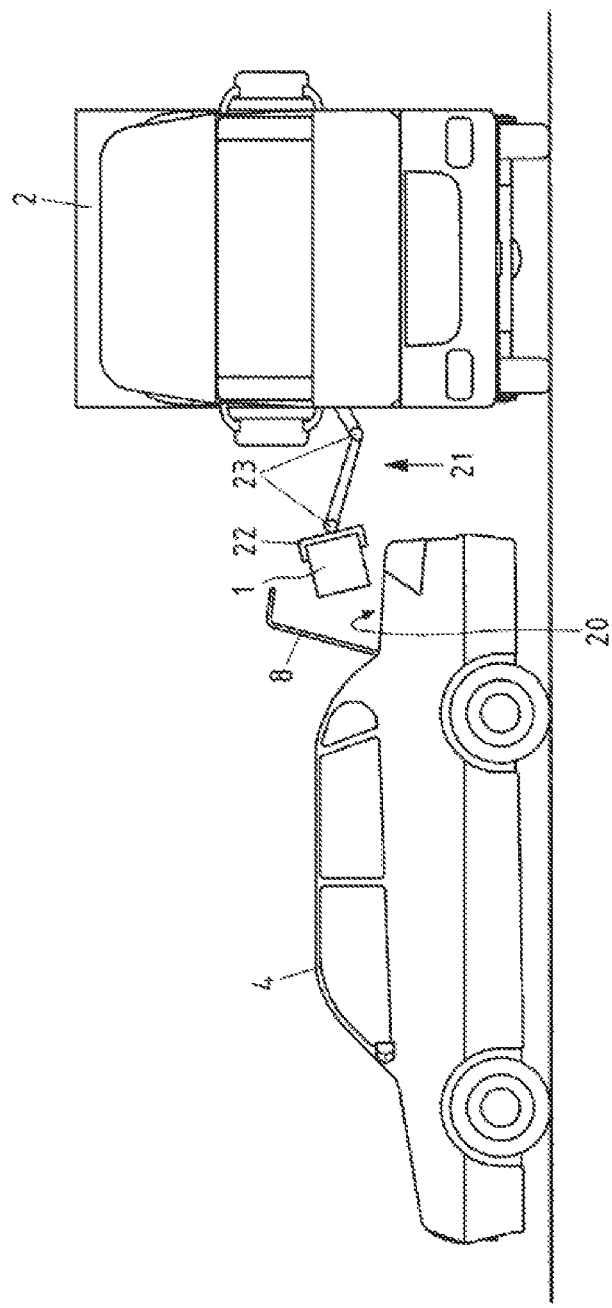

As illustrated in FIG. 2E, in the present method example, the control apparatus 14 transmits a piece of status information 19 to the distribution vehicle 2, in particular to the control means 15 of the distribution vehicle 2, either directly or indirectly via the remote control apparatus 17. If the status information 19 is transmitted indirectly, the remote control apparatus 17 forwards the status information 19 to the distribution vehicle 2. The status information 19 informs the distribution vehicle 2 that the closure unit 8 has been properly opened. The shipment 1 can therefore now be inserted through the opening, which is uncovered by the open closure unit 8, more specifically the door, in particular the trunk lid or tailgate, into the customer vehicle 4, into the trunk 20 in the present case. This is carried out according to FIG. 2F with the aid of a transport unit in the form of a gripping arm which comprises a gripping section 22 for gripping the shipment 1. The transport unit 21 in the form of the gripping arm also comprises a plurality of joints 23 which provide the gripping arm with the necessary flexibility in order to be able to always engage in the customer vehicle 4 through the open closure unit 8 in a reliable manner and without damaging the customer vehicle 4. In this case, the gripping section 22 functions in a similar manner to a hand, with the result that a shipment 1 held ready in the customer vehicle 4 can also be gripped by the gripping section 22, if necessary, and can be removed from the vehicle through the open closure unit 8 and can be placed into the distribution vehicle 2.

Figure 2G:
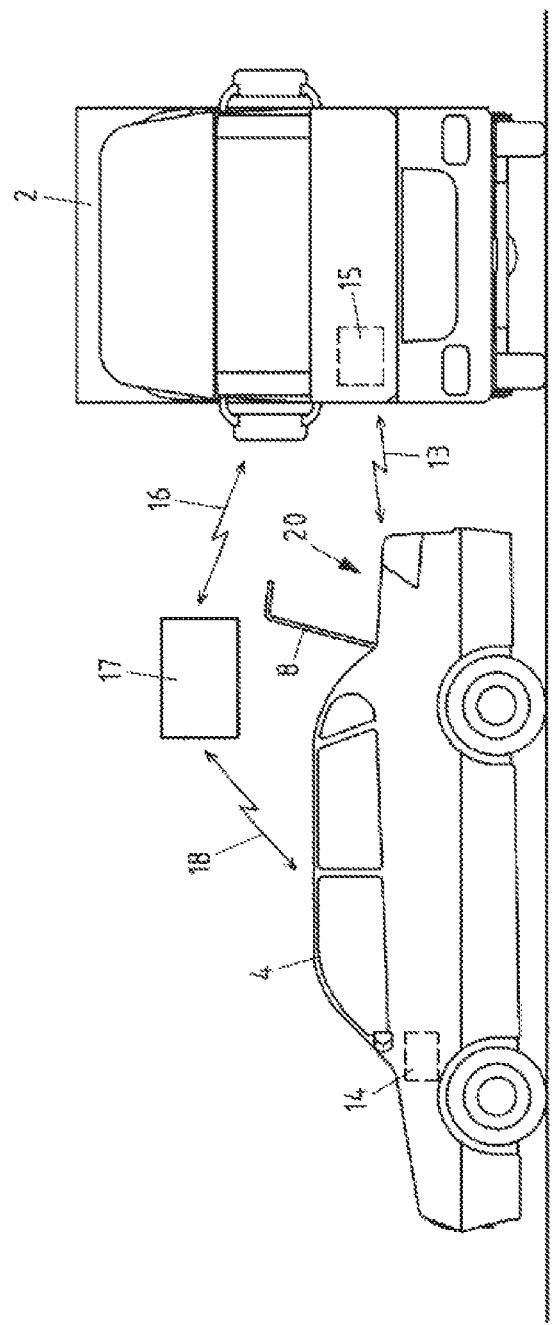

After placing the shipment 1 into the customer vehicle 4, the distribution vehicle 2 transmits a further piece of control information 13 to the control apparatus 14 of the customer vehicle 4 via the control means 15, as illustrated in FIG. 2G. Alternatively, the control means 15 can transmit a piece of remote control information 16 to the remote control apparatus 17. After receiving and processing the remote control information 16, the remote control apparatus 17 transmits a piece of remote activation information 18 to the control apparatus 14 of the customer vehicle 4. Closing and locking of the open closure unit 8 of the customer vehicle 4 are caused in both ways. After receiving and processing the control information 13 or the remote activation information 18, the control apparatus 14 of the customer vehicle 4 controls actuators, for instance electric motors, of the customer vehicle 4 which ensure that the closure unit 8 is closed and locked.

Figure 2H:
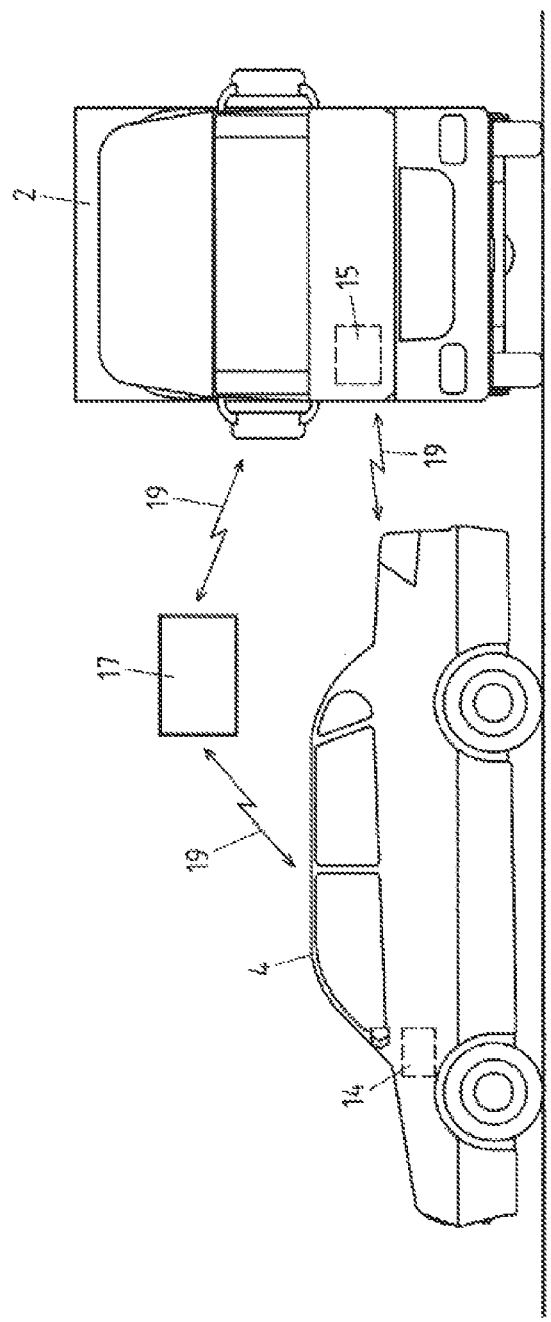

Once this has taken place, the control apparatus 14 of the customer vehicle 4 transmits a piece of status information 19 to the distribution vehicle 2, as illustrated in FIG. 2H. This can take place either directly or indirectly via the remote control apparatus 17 which forwards the status information 19 to the distribution vehicle 2. The status information 19 informs the distribution vehicle 2 that closing and locking of the closure unit 8 have been successfully concluded. The process of placing the shipment 1 into the customer vehicle 4 is therefore considered to have been concluded for the distribution vehicle 2. The distribution vehicle 2 then moves to the next customer vehicle 4 in order to place a shipment 1 into the next customer vehicle and/or to remove a shipment 1 from the latter. In principle, the same method steps as those described above are performed. However, differences may also exist in individual points or a plurality of points.

Figure 3:
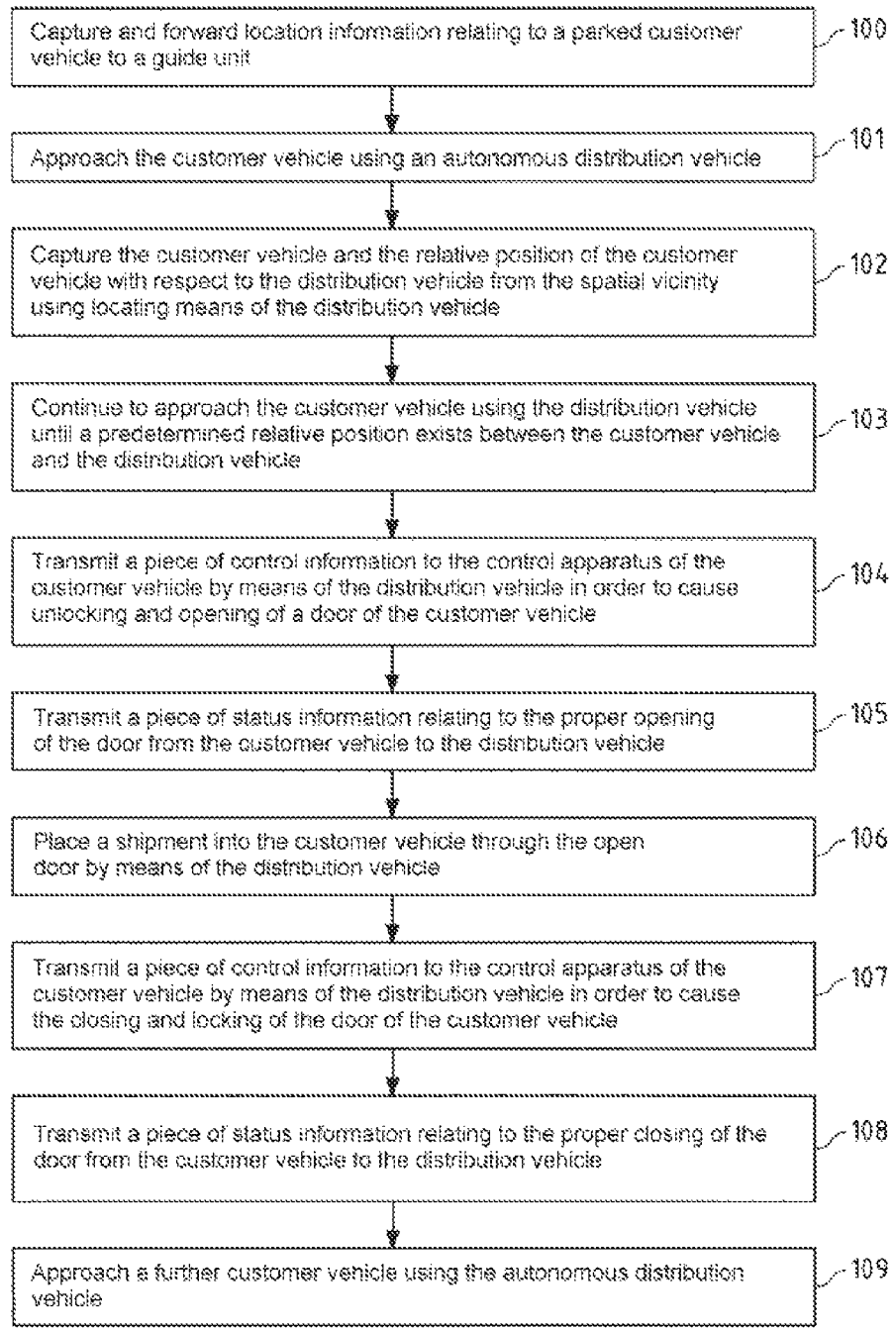
FIG. 3 shows a schematic flowchart illustration of the method according to FIG. 1.

FIG. 3 explains the method schematically again and fundamentally in the form of a flowchart. In a first step 100, the customer vehicle or a customer captures a piece of location information relating to the parked customer vehicle and forwards it to a guide unit. In a subsequent step 101, the distribution vehicle approaches the customer vehicle on the basis of this location information, the distribution vehicle moving autonomously, to be precise also through the public road traffic, in which case the distribution vehicle uses public roads.

Having arrived in the vicinity of the customer vehicle, the distribution vehicle captures the customer vehicle sought in a further step 102, for instance using the motor vehicle license plate number. Furthermore, the relative position of the customer vehicle with reference to the distribution vehicle is captured by the distribution vehicle. On the basis of said data, the distribution vehicle continues to approach the customer vehicle in the next step 103 until the distribution vehicle is positioned favorably with respect to the customer vehicle.

Once this relative position of the distribution vehicle has been reached, the distribution vehicle transmits a piece of control information to a control apparatus of the customer vehicle in the subsequent step 104 by means of a control means, which control apparatus causes a closure unit, in particular a door, for instance a rear door, in particular a trunk lid or tailgate, side door or the like of the customer vehicle, to be unlocked and opened, to be precise by the customer vehicle itself, in particular.

In the next step 105, the distribution vehicle is informed of the proper opening of the closure unit by the customer vehicle by means of a forwarded piece of status information. This causes the distribution vehicle in the subsequent step 106 to grip a shipment arranged in the distribution vehicle using a gripping section of a gripping arm and to place the shipment into the customer vehicle through the opening which is now uncovered, in particular through the open closure unit of the customer vehicle. Alternatively or additionally, however, the gripping section of the gripping arm may also remove a shipment held ready in the customer vehicle and may place the shipment into the distribution vehicle through the opening which is now uncovered, in particular through the open closure unit.

The control means of the distribution vehicle then transmits a piece of control information to the control apparatus of the customer vehicle in a further step 107. On account of the control information being received and processed by the control apparatus, the control information causes closing and locking of the previously open closure unit of the customer vehicle.

Conversely, in the next step 108, the control apparatus of the customer vehicle again transmits a piece of status information to the control means of the distribution vehicle. The status information signals to the distribution vehicle that the method connected to this customer vehicle has been concluded and the distribution vehicle can approach a further customer vehicle in a subsequent step 109 autonomously again and at least partially via the public road traffic, which is also performed by the distribution vehicle in the present method example.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for autonomously delivering and/or collecting at least one shipment using at least one distribution vehicle,
   in which a distribution vehicle approaches a customer vehicle at least partially autonomously and at least partially via the public road traffic,
   in which the distribution vehicle at least partially autonomously causes opening of a closure unit of the customer vehicle,
   in which, when the closure unit is open, the distribution vehicle at least partially autonomously places a shipment into the customer vehicle and/or at least partially autonomously removes a shipment from the customer vehicle,
   in which, after placing and/or removing the shipment, the distribution vehicle at least partially autonomously causes closing of the closure unit of the customer vehicle.

2. The method according to claim 1,
   in which, after closing of the closure unit, the distribution vehicle moves to a further customer vehicle at least partially autonomously and at least partially via the public road traffic, and
   in which the distribution vehicle at least partially autonomously places a shipment into the further customer vehicle and/or removes a shipment from the further customer vehicle.

3. The method according to claim 1,
in which, before opening of the closure unit of the customer vehicle, the distribution vehicle at least partially autonomously causes unlocking of the closure unit and/or, after closing of the closure unit of the customer vehicle, causes locking of the closure unit.

4. The method according to claim 1,
in which at least one shipment is placed into the customer vehicle and/or is removed from the customer vehicle with the aid of a transport unit, preferably in the form of a gripping arm, in particular comprising a gripping section for gripping at least one shipment.

5. The method according to claim 1,
in which the at least one customer vehicle is parked in a parking lot, preferably a public parking lot, a customer parking lot and/or a company parking lot, and preferably
in which the distribution vehicle has access authorization and an access effecting means for effecting access to the parking lot.

6. The method according to claim 1,
in which the distribution vehicle transmits at least one piece of control information to a control apparatus of the customer vehicle, and
in which the control apparatus of the customer vehicle causes unlocking, opening, closing and/or locking of the closure unit as a result of the at least one piece of control information being received and processed.

7. The method according to claim 1,
in which an operating unit for operating the closure unit is brought into contact with the closure unit of the customer vehicle, and
in which the operating unit causes unlocking, opening, closing and/or locking of the closure unit as a result of the contact with the closure unit, for example.

8. The method according to one of claim 1,
in which the distribution vehicle transmits at least one piece of remote control information to a remote control apparatus which preferably remotely controls the control apparatuses of a multiplicity of vehicles,
in which the remote control apparatus transmits at least one piece of remote activation information to the control apparatus of the customer vehicle as a result of the at least one piece of remote control information being received and processed, and
in which the control apparatus of the customer vehicle causes unlocking, opening, closing and/or locking of the closure unit as a result of the at least one piece of remote activation information being received and processed.

9. The method according to claim 8,
in which the remote control apparatus performs an authorization check using the remote control information and/or the control apparatus performs an authorization check using the control information and/or the remote activation information, and
in which the control apparatus of the customer vehicle causes unlocking, opening, closing and/or locking of the closure unit in the event of a successful authorization check.

10. The method according to claim 6,
in which the control apparatus and/or the remote control apparatus transmit(s) at least one piece of status information to the distribution vehicle, and
in which the at least one piece of status information enables and/or blocks unlocking, opening, closing and/or locking of the closure unit, and/or
in which the at least one piece of status information enables, initiates and/or blocks placing of the at least one shipment into the customer vehicle and/or removing of the at least one shipment from the customer vehicle.

11. The method according to claim 6,
in which the at least one piece of control information, the at least one piece of remote control information, the at least one piece of remote activation information, the at least one piece of status information and/or one piece of access authorization information is transmitted via Bluetooth, a wireless local area network (WLAN) and/or a mobile radio network, in particular the global system for mobile communication (GSM), the universal mobile telecommunications system (UMTS) and/or long term evolution (LTE).

12. The method according to claim 1,
in which the distribution vehicle has means for detecting the position, the distance and/or the orientation of the customer vehicle and/or of the closure unit of the customer vehicle using at least one optical locating means capturable by the distribution vehicle, preferably a motor vehicle license plate number, a barcode, a computer-generated hologram, and/or using at least one electrical locating means which is readable by the distribution vehicle, preferably a radio-frequency identification (RFID) tag and/or a near field communication (NFC) tag, and/or using at least one locating signal which is emitted by the customer vehicle and is receivable by the distribution vehicle and is preferably transmitted via a local radio network, for instance Bluetooth and/or a wireless local area network (WLAN), and/or a mobile radio network, in particular the global system for mobile communication (GSM), the universal mobile telecommunications system (UMTS) and/or long term evolution (LTE).

13. The method according to claim 1,
in which the distribution vehicle determines the relative position of the distribution vehicle with respect to the customer vehicle and/or with respect to the closure unit of the customer vehicle with the aid of a distance sensor, preferably using the at least one locating means and/or the at least one locating signal, and preferably
in which the distribution vehicle is made to approach the customer vehicle and/or the closure unit of the customer vehicle in a predetermined manner by means of a distance control apparatus on the basis of the relative position of the distribution vehicle with respect to the customer vehicle and/or with respect to the closure unit of the customer vehicle.

14. The method according to claim 1,
in which the customer vehicle and/or the driver determine(s) position information, in particular GPS information, relating to the position of the customer vehicle and transmit(s) the position information to the distribution vehicle and/or to a guide unit for guiding the distribution vehicle at least into the vicinity of the customer vehicle, preferably via Bluetooth, a wireless local area network (WLAN) and/or a mobile radio network, in particular the global system for mobile communication (GSM), the universal mobile telecommunications system (UMTS) and/or long term evolution (LTE).

15. A distribution vehicle for performing the method according to claim 1.

16. A distribution system for performing the method according to claim 1, comprising at least one distribution vehicle and at least one remote control apparatus and/or a guide unit.

* * * * *